Sept. 3, 1929. N. M. SLEEPER 1,726,722

PEAR PEELER

Filed July 6, 1927

INVENTOR.
Ned M. Sleeper
BY Miller & Boykin
ATTORNEYS.

Patented Sept. 3, 1929.

1,726,722

UNITED STATES PATENT OFFICE.

NED M. SLEEPER, OF UPPER LAKE, CALIFORNIA.

PEAR PEELER.

Application filed July 6, 1927. Serial No. 203,736.

This invention relates to apparatus for peeling pears, or other fruit or vegetables which are firm enough to be impaled and rotated against peeling cutters, and the objects of the invention are to provide special apparatus and cutters, which will effectively peel unsymmetrically shaped fruit and vegetables such as pears or potatoes with minimum hand labor, and with minimum waste of food material with the skins removed.

Briefly described my apparatus comprises first a revolving cutter for centering and reaming out the bloom end of the pear as well as removing an area of skin adjacent the bloom end, and second a revolving impaling spindle upon which the reamed pears are advanced and presented to a special high speed revolving peeling cutter or cutters which rise and fall over the entire surface of the fruit while removing the skin only therefrom along a spiral swath. Automatic features are incorporated with the above to stop and start actuation of the pear spindle and to discharge the peeled fruit, also a multiple spindle machine is provided to increase the output presided over by a given operative.

Figure 1:
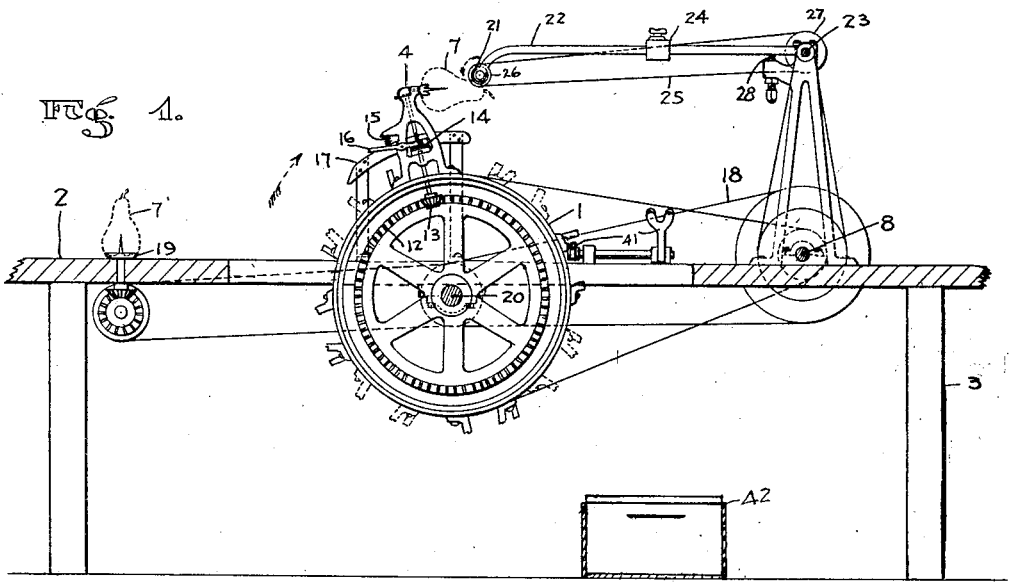
Figure 2:
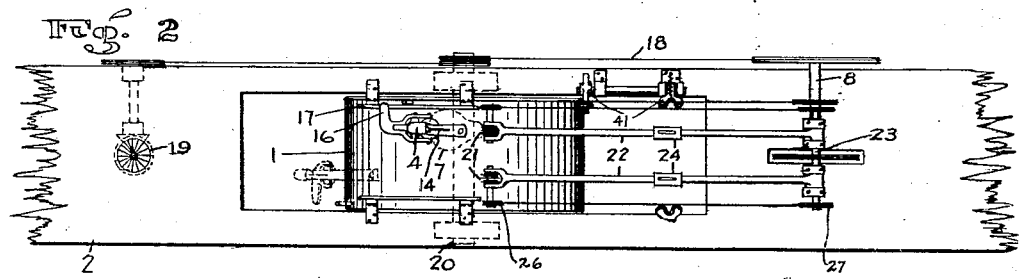
Figures 3, 4, 5, 6, 7:
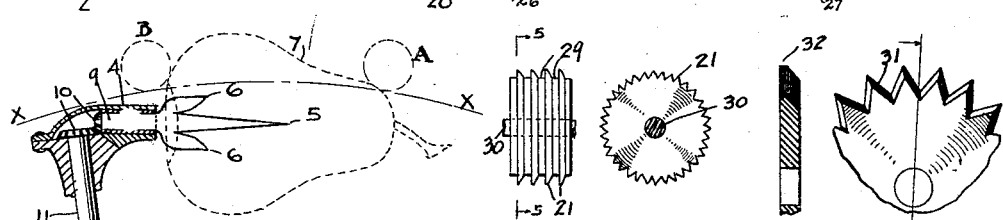
Figure 8:
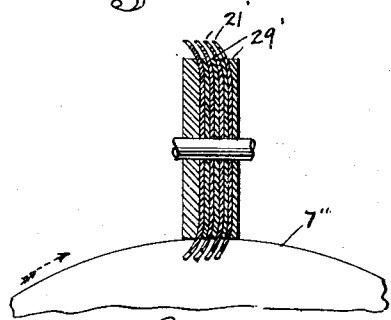
Figures 9, 10:
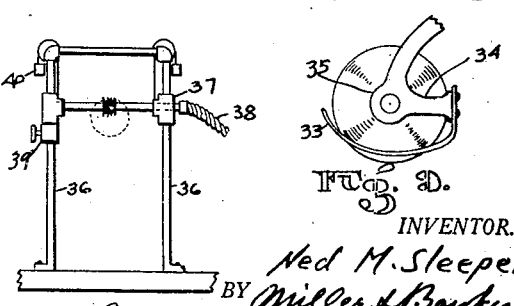

In the drawings accompanying this specification Fig. 1 is a side elevation of my apparatus, Fig. 2 is a plan view thereof, Fig. 3 is an enlarged view of the pear spindle with fruit dotted in position and showing the start and finish position of the peeling cutter. Fig. 4 is an enlarged edge view of the peeling cutter blades and idlers. Fig. 5 is a plan view of the cutter blades as seen from the line 5—5 of Fig. 4. Figures 6 and 7 are respectively greatly enlarged edge and plan views of a portion of the cutter blades showing the form of the teeth. Fig. 8 is an enlarged vertical section of a cutter with modified or cup-shaped blades. Fig. 9 is a side elevation of a cutter showing stationary instead of revolving guards, and Fig. 10 is an elevation showing a vertically sliding mount for the cutter instead of the swinging mount as shown in Fig. 1.

In further detail the apparatus comprises a rotatable carrier 1 projecting through a table top 2 of the main frame 3 and which carrier carries a plurality of pear spindle heads 4, (one only being shown complete and the bases of the others broken off) each provided with an impaling bit comprising a point 5 provided with spurs 6 for holding a pear as dotted at 7 firmly in place for revolving with the spindle.

The carrier is revolved by any suitable means from a common drive shaft 8 actuated from any suitable source of power, and the pear or fruit bit is mounted on or secured to a spindle 9 carried in the head 4 and which through means of suitable gears 10 is rotated by means of a substantially radial shaft 11 in turn driven by a master gear or friction 12 engaging a pinion 13 on the inner end of the shaft 11. The shaft 11 is preferably in two sections connected by a small clutch 14 normally disengaged by a spring 15 acting on the lever 16 so that for the major part of the carrier travel the fruit does not revolve, and to revolve it during the peeling operation a cam plate 17 is provided which trips the lever 16 and holds the clutch engaged until the rotation of the carrier carries the lever beyond the end of the plate and at which time the spindle again stops its rotation.

The master gear 12 is driven independently of drum or carried 1 by the belt 18 at a speed in relation to the speed of revolution of the carrier so that as the fruit impaled on the spindle is advanced a distance equal to its length the fruit is revolved a great many times.

Before placing the fruit upon the spindle it is pressed against a special reamer 19 as shown at 7' in Fig. 1. This reamer 19 driven from the drum shaft 20 as indicated or any other source of power, and is arranged to project vertically just above the table-top 2, and is so shaped as to ream out the bloom and a small centralizing hole, as well as remove the skin from the base or bloom end of the fruit by following its contour for a distance.

To peel the fruit I employ a special high speed revolving cutter 21 which is mounted on an arm 22 pivoted at 23 to rise and fall while maintaining the cutter over the central axis of the fruit.

This cutter is driven at very high speed preferably in direction of the arrow and its pressure against the fruit is controlled by any suitable adjustable means such as the small weight 24 slidable on the arm 22.

The drive of the cutter is here represented as a belt 25 passing over suitable pulleys 26—27 but it is to be understood that no limit is implied thereby as any form of drive may be used for the cutter or any other part of the machine.

The swinging arm 22 is provided with an adjustable stop 28 so that the cutter will not descend below the arc X shown in Fig. 3 and thereby be in correct position at the forward end of the fruit as indicated at A to start the cut and ride over the same, and to stop at the rear end of the fruit in the same relation to the arc X as indicated at B, and thereby clearing the spindle head 4 and its housing covering the gears 10 so as to be in the correct position for the next pear carried on the next spindle or pass over same if no pear is in place.

The revolvable cutter is about the size of a penny in diameter and is composed of several small circular saw-like blades 21 separated by plain or idler disks 29. The blades being driven on shaft 30 with idlers free thereon, and the teeth of the blades are preferably beveled off at one side as indicated at 31 while preserving small straight tip to the teeth at 32.

Another form of blade found to give good results is that shown in Fig. 8 wherein the blades 21' are saucer-shaped, it being understood that teeth are also formed on the edges as per Fig. 5. The washers or idlers in this assemblage being indicated as 29'.

With either cutter described, the cutting teeth project a slight distance, about a 32nd of an inch, beyond the periphery of the idlers and the fruit 7'' is rotated toward the points or leading edges of the blades as indicated in Fig. 8.

Instead of the rolling idlers it is possible with some cutters to use stationary guard fingers lying between the blades as shown at 33 in Fig. 9, the guards being mounted on an extension 34 of the bearing 35 of the cutter shaft.

An optional construction of the rising and falling cutter mounting is shown in Fig. 10 wherein a pair of vertical guides 36 slidingly supports the bearings 37 for the cutter shaft while a flexible shaft 38 supplies the power. A stop 39 on the guide controls the descent of the cutter and a small counterweight 40 controls the effective weight of the cutter upon the fruit.

Since the rotation of the carrier 1 is quite slow a plurality of rows of the fruit spindles are mounted thereon and preferably staggered as indicated, so that an operative can ream the pears on cutter 19 and place them on the successively rising spindles as they appear above the table.

In operation the high speed cutter rises and falls over the unsymmetrical form of the pear while the pear slowly advances and also rotates on its spindle across the path of the cutter thus resulting in a spiral swath of skin being removed and which on account of its breadth joins the spirals into a perfect and complete removal of the skin.

The disks 29 control the penetration, and the cutter being set in the plane of the pear's advancement easily rolls up and down over the same.

As the fruit is thus peeled the spindle stops as explained and as the carrier continues to advance a suitable trip or ejector 41 ejects the fruit into a box as at 42 placed beneath the table.

Having described my apparatus as a pear peeler, it will nevertheless be seen to be applicable to other fruits or vegetables and in using the word pear or fruit in my claims it is understood as embracing other fruit or vegetables on which the machine will operate.

I claim:

1. In a pear peeler, means for holding and rotating a pear, a rotary cutter, an arm pivoted to a support and said cutter rotatably mounted at the end of the arm in a manner to rest against the pear and move toward and away from the pear, means for rotating the cutter, and means for rotating the pear and advancing the same longitudinally in contact with the rotating cutter, said cutter revolving on an axis extending transversely of the longitudinal axis of the pear and comprising a series of circular saw-like blades spaced by guard members lying within the outer diameter of the blades.

2. In a fruit peeler of the character described, a rotary cutter comprising a circular saw-like disk blade with teeth formed on its edge, a driving shaft to which the blade is rotatably secured, and a guard lying within the diameter of the blade adjacent the side of the disk.

3. In a fruit peeler of the character described, a rotary cutter comprising a circular saw-like disk blade with teeth formed on its edge, a driving shaft to which the blade is rotatably secured, and a revolvable disk guard lying within the diameter of the blade adjacent the side of the disk.

4. In a fruit peeler of the character described, a plurality of spaced circular saw-like disk blades, a driving shaft extending through said blades, spacing disks between said blades of a diameter slightly less than said blades to control the depth of cut made by said blades.

5. In a pear peeler, means for holding and rotating a pear, a rotary cutter yieldingly presented against the pear with its axis of rotation extending transversely to the longitudinal axis of the pear, and means for passing the revolving cutter over the length of the pear while rotating the pear, said last mentioned means comprising a revolvable carrier, a pear impaling spindle on said carrier extending in the direction of rotation so as to swing a pear impaled thereon longitudinally in the arc of rotation past said cutter, and means for revolving said spindle.

6. A structure as specified in claim 5 wherein a plurality of said spindles is mounted around said revolvable carrier in staggered relation.

7. In an apparatus of the character described, a rotary carrier, a shaft projecting therefrom, a fruit impaling spindle extending substantially at right angle to said shaft, means gearing said spindle to said shaft, a housing rotatably sustaining said spindle and shaft, means for rotating the carrier, and means for rotating said spindle.

8. The method of peeling a fruit which comprises first reaming a hole axially of the fruit from its bloom end and simultaneously removing the skin from the adjacent area of the fruit, then supporting the reamed fruit and revolving same on the axis of the reamed hole while removing the remainder of the skin.

NED M. SLEEPER.